(12) United States Patent
Halmos

(10) Patent No.: US 6,559,932 B1
(45) Date of Patent: May 6, 2003

(54) SYNTHETIC APERTURE LADAR SYSTEM USING INCOHERENT LASER PULSES

(75) Inventor: Maurice J. Halmos, Encino, CA (US)

(73) Assignee: Raytheon Company, Lexington, MA (US)

( * ) Notice: Subject to any disclaimer, the term of this patent is extended or adjusted under 35 U.S.C. 154(b) by 0 days.

(21) Appl. No.: 10/020,730

(22) Filed: Oct. 30, 2001

(51) Int. Cl.[7] .............................. G01C 3/08; G01P 3/36
(52) U.S. Cl. ...................... 356/5.03; 356/5.09; 356/28.5
(58) Field of Search ............................. 342/25; 356/28, 356/5.01–5.15

(56) References Cited

U.S. PATENT DOCUMENTS

| | | | |
|---|---|---|---|
| 4,687,281 A | * 8/1987 | Gross | 356/4.09 |
| 5,079,555 A | * 1/1992 | Turpin | 342/179 |
| 5,237,331 A | * 8/1993 | Henderson et al. | 342/26 |
| 5,621,514 A | * 4/1997 | Paranto et al. | 180/169 |
| 5,659,320 A | * 8/1997 | Pouit | 342/115 |
| 5,835,199 A | * 11/1998 | Phillips et al. | 356/28.5 |
| 5,847,817 A | * 12/1998 | Zediker et al. | 356/28.5 |

OTHER PUBLICATIONS

C.C. Aleksoff, J. S. Accetta, L. M. Peterson, A.M. Tai, A. Klooster, K.S. Schroeder, R. M. Majewski, J. O. Abshier & M. Fee, "Synthetic aperture imaging with a pulsed $CO_2$ TEA laser", SPIE, vol. 783, Laser Radar II (1987), pp. 29–34.
Jeffrey H. Shapiro, "Performance analysis of optical synthetic aperture radars", SPIE, vol. 999, Laser Radar III (1988), pp. 100–116.
Stephen Marcus, Barry D.Colella & Thomas Green, Jr., "Solid–state laser synthetic aperture radar", Allied Optics, vol. 33, No. 6, Feb. 20, 1994, pp. 960–964.

\* cited by examiner

*Primary Examiner*—Thomas H. Tarcza
*Assistant Examiner*—Brian Andrea
(74) *Attorney, Agent, or Firm*—Colin M. Raufer; Leonard A. Alkov; Glenn H. Lenzen, Jr.

(57) ABSTRACT

An incoherent ladar transmitter (12) adapted for use with synthetic aperture processing. The system (12) includes a first mechanism (44, 48, 50) for generating a laser beam (18). A second mechanism (44, 68) records phase information pertaining to the laser beam (18) and subsequently transmits the laser beam (18) from the system in response thereto. A third mechanism (40) receives a reflected version (20) of the laser beam and provides a received signal in response thereto. A fourth mechanism (72) corrects the received signal based on the phase information recorded by the second mechanism (44, 68). In a more specific embodiment, the ladar system (12) includes a synthetic aperture processor (46) for correcting the received signal based on the phase information and providing a corrected laser signal in response thereto. The synthetic aperture processor (46) includes a mechanism (76) for applying, a Discrete Fourier Transform (DFT) to the corrected laser signal to obtain high frequency resolution and cross-range resolution. A fifth mechanism (48) constructs a range-Doppler image based on the corrected laser signal and the movement of the ladar system (12).

25 Claims, 6 Drawing Sheets

SYNTHETIC APERTURE LADAR SYSTEM USING INCOHERENT LASER PULSES

BACKGROUND OF THE INVENTION

1. Field of Invention

This invention relates to laser radar systems (ladars). Specifically, the present invention relates to synthetic aperture ladar systems employing incoherent laser pulses.

2. Description of the Related Art

Ladar systems are employed in various applications including high-resolution 3-dimensional imaging, mapping, chemical analysis, and military targeting applications. Such applications require accurate, space-efficient, and cost-effective ladar systems.

Ladar systems are particularly applicable for long-range, high-resolution 3-dimensional imaging applications employed in terrain mapping and target imaging applications on satellites and missile systems. A ladar system often includes a sensor suite mounted on a satellite, missile system, or aircraft. The sensor suite has one or more fixed physical apertures through which a ladar system views a scene. A ladar system views a scene by transmitting a laser through the aperture toward the scene. The laser reflects off the scene, producing a laser return that is detected by the ladar system. Many conventional radar and ladar systems measure the intensity of the return beam and the round trip delay from transmission to detection, which yields the distance (range) to the scene. Laser return intensity and range information may be combined with other image information to facilitate target tracking, terrain mapping, and so on.

Ladar systems are either coherent or noncoherent. Coherent ladar systems transmit a laser beam with a predetermined phase and frequency. Knowledge of the spectral characteristics of the transmitted laser beam enables coherent ladar systems to record additional information about the scene, such as target movement, and to further improve Signal-to-Noise Ratio (SNR) over corresponding noncoherent ladar systems. The velocity of a target may be determined from the frequency spectrum of the laser return.

Conventional noncoherent ladar systems typically lack phase and frequency information pertaining to the transmitted laser beam. A noncoherent detector combines various wavelengths of the laser return and converts them into corresponding electrical signals. Consequently, without laser spectrum information, certain types of noise filtering, which would increase SNR, are difficult or impossible to implement.

Generally, coherent ladar systems have several advantages over noncoherent ladar systems. For example, coherent ladar systems generally have better SNR's than corresponding noncoherent systems. Unlike incoherent ladar systems, coherent ladar systems may reach Shot Noise Limited (SNL) sensitivity to maximize the SNR. SNL sensitivity is achieved by scaling up the power of a local oscillator aimed on the detector surfaces.

Typically, a coherent ladar system receiver detector is illuminated by a laser return and a local oscillator reference beam. The detector outputs a cross-product of the laser return and local oscillator optical fields. The desired information about a scene is contained in the portion of the detector's output that oscillates at the frequency difference between the local oscillator reference beam and the laser return. This output is often narrow-band filtered to eliminate noise in frequency regions outside predicted signal locations. This noise filtering is enabled by the preservation of the spectrum information pertaining of the transmit laser by an optical heterodyne or homodyne detection process. Non-coherent ladar systems generally do not perform this noise filtering, since they lack requisite spectrum information pertaining to the transmitted laser beam. Unfortunately, coherent ladar systems are generally more sensitive to misalignments and beam distortions.

In a conventional ladar imaging system not employing synthetic aperture methods, image cross-resolution is limited by the size of the ladar system aperture. Very large and expensive apertures are required to obtain sufficient resolution for many current long-range imaging and mapping applications. This is particularly problematic for ladar systems employed in satellites or missile systems, which have prohibitive space constraints and require long-range viewing capabilities.

To reduce aperture-size requirements, synthetic aperture radar and ladar systems are employed. In a synthetic aperture ladar system, additional information about the scene is obtained by changing the viewing angle of the scene. This additional information, called cross-range information, is contained in Doppler frequency shifts detected in the laser return caused by the transmit laser striking various features of the scene at different angles. Cross-range information indicates the relative angular position of certain scene features associated with a given range or distance from the ladar system. The cross-range information is combined with range information to yield an accurate scene profile to enhance the image of the scene.

High resolution topography applications operating at a range of approximately 100 kilometers, an eye-safe laser wavelength of $1.5 \times 10^{-6}$ m, and a typical cross resolution of 20 cm, require a conventional aperture of approximately 75 cm, which is prohibitively large and expensive for many applications. The large apertures are also undesirably sensitive to thermal and gravitational distortions. An analogous synthetic aperture ladar system on a platform travelling at, for example, 100 m/s would require 7.5 milliseconds (ms) to cover the required 75 cm aperture. In traditional ladar, this requires that the laser transmitter produce a high-power waveform that is coherent for the full 7.5 ms. The high power is often required to reach long ranges of interest. Typically, coherent waveforms longer than a fraction of a millisecond are difficult to achieve, especially at high power levels. In addition to coherence time and high power, the transmitted waveform requires high bandwidth to achieve high down-range resolution, yielding typical bandwidth-time products (BT) greater than 300,000. This implies that the transmitted waveform must be accurate (phase coherent) to $1/300{,}000$ (1/BT). Consequently, conventional synthetic aperture ladar systems have generally been unsuccessful in achieving this bandwidth time product.

Previous synthetic aperture ladar systems could not maintain transmitter coherence for sufficient duration to accurately measure a scene. Accurate synthetic aperture measurements require relatively high beam pulse energy for which coherence is difficult to maintain. For example, synthetic aperture ladar systems employing trains of FM chirped signals are employed on some mobile ladar systems. Unfortunately, these systems have difficulty maintaining laser beam coherence, yielding inferior imaging capabilities.

Generally, conventional synthetic aperture ladar systems require a coherent waveform throughout the measuring time during which the laser return is detected. This severely limits waveform selection, preventing use of otherwise more desirable waveforms, such as high-energy Q-switched pulses.

Hence, a need exists in the art for an efficient synthetic aperture ladar system that does not require transmission of a coherent laser beam yet maintains the advantages of coherent ladar systems over those of conventional noncoherent ladar systems while maintaining beam alignment advantages of noncoherent systems. There exists a further need for a synthetic aperture ladar system that employs Q-switched laser pulses and an accompanying receiver for detecting a Q-switched laser return.

SUMMARY OF THE INVENTION

The need in the art is addressed by the synthetic aperture ladar system using incoherent laser pulses of the present invention. In the illustrative embodiment, the inventive system is adapted for use with synthetic aperture ladar systems employed in military targeting and imaging applications. The ladar system includes a first mechanism for generating a laser beam. A second mechanism records phase information pertaining to the laser beam and subsequently transmits the laser beam from the system in response thereto. A third mechanism receives a reflected version of the laser beam and provides a received signal in response thereto. A fourth mechanism corrects the received signal based on the phase information recorded by the second mechanism.

In a specific embodiment, the ladar system is a synthetic aperture ladar system that further includes a fifth mechanism for moving the ladar system while the ladar system operates. The fourth mechanism includes a synthetic aperture processor for correcting the received signal in accordance with the phase information and providing a corrected ladar signal in response thereto. The synthetic aperture processor includes a mechanism for applying a Discrete Fourier Transform (DFT) to the corrected ladar signal to obtain high-resolution frequency and cross-range information. A fifth mechanism constructs a coherent range-Doppler scene profile based on the corrected ladar signal and the movement of the ladar system.

The first mechanism includes an Er:Yb:Glass Q-switched laser or an Er:Yb:YAG high-power laser for generating the transmitted laser beam. The second mechanism includes a digitizer for recording the phase information and frequency information. The phase information includes waveform information about the transmitted laser beam including measured phase jumps, phase offsets, frequency hops, and frequency offsets. The transmitted laser beam comprises Q-switched or Q-switched mode locked ladar pulses having random phase (incoherent) from shot to shot.

The third mechanism includes an In-phase (I) and Quadrature (Q) receiver for implementing I and Q detection and outputting the received signal having I and Q electrical signal components in response thereto. The I and Q receiver is an optical heterodyne receiver that includes a local oscillator for generating reference beam. An optical retarder shifts the reference beam. An l-detector and a Q-detector detect a combination of the reference beam and the reflected version of the laser beam and a combination of the shifted reference beam and the reflected version of the laser beam, respectively. The I and Q heterodyne receiver further includes one or more beam splitters having reflectivities specified to equalize intensities of the reflected version of the laser beam, the reference beam, and the shifted reference beam at the I and Q detectors.

In a more specific embodiment, the third mechanism further includes a digitizer for converting the received signal from an analog signal to a digital received signal with I and Q components. A range demultiplexer isolates portions $((r_I+i*r_Q)_n,)$ of the digital received signal which represent laser returns, each associated with a range bin (n).

The fourth mechanism maintains detected phases ($\theta_1$, $\theta_2$, $\theta_m$, ... $\theta_M$) and frequency offset ($f_1$, $f_2$, $f_m$, ... $_{fM}$) associated with each of the M transmitted laser pulses. Another mechanism corrects the digital received signal $((r_I+i*r_Q)_{n,m})$ based on the detected phases and frequency offsets that were measured on the outgoing pulses and provides the corrected signal in response thereto in accordance with the following equation:

$$\text{Corrected Signal} = Re\{(r_I+i\cdot r_{Qn,m}\cdot e^{(-i(\theta_m+2\pi f_m\tau))}\}$$

where $(r_I+i*r_Q)_{n,m}$ represents a portion of the digital received signal associated with an $n^{th}$ range bin and the $m^{th}$ pulse having an in-phase component $r_I$ and a quadrature component $r_Q$; $\theta_m$ represents a phase correction term associated with one of the detected phases that is associated with the $m^{th}$ pulse; $f_m$ represents a frequency correction term associated with the $m^{th}$ pulse; and $\tau$ is a digital time variable.

The fourth mechanism further includes a mechanism for computing centroids, one centroid for each $n^{th}$ portion of the received digital signal, based on the square of the magnitude of a DFT of each $n^{th}$ portion of the received digital. Another mechanism extracts peak intensity information and range Doppler information from the centroids and image information about the scene.

The novel design of the present invention is facilitated by the second mechanism for recording phase information about the transmitted laser beam and by the fourth mechanism for correcting the laser return based on the recorded phase information. This relieves coherence requirements on the transmitted laser, thereby enabling use of very desirable transmit waveforms, such as high-energy Q-switched beams, for which coherence is difficult to maintain.

DESCRIPTION OF THE INVENTION

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

Figure 1:
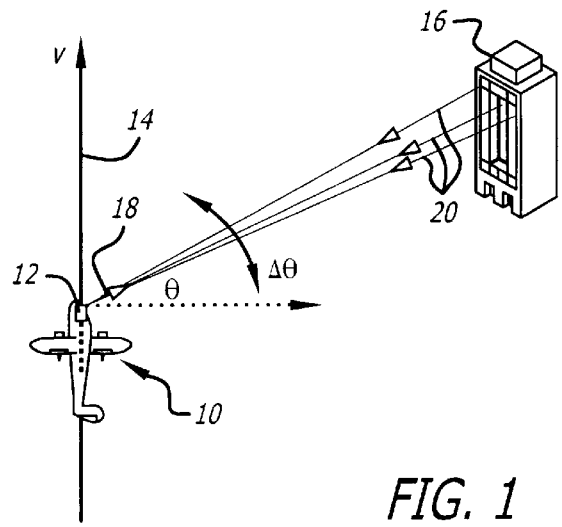
FIG. 1 is a diagram showing an aircraft employing a ladar system constructed in accordance with the teachings of the present invention and illustrating general ladar principles of operation.

FIG. 1 is a diagram showing an aircraft 10 employing a ladar system 12 constructed in accordance with the teachings of the present invention and illustrating general ladar principles of operation. The aircraft 10 has a velocity vector (V) 14 as it flies by a building 16. The ladar system 12 is mounted on the front of the aircraft 10 and transmits a laser beam 18 toward the building 16.

In the present embodiment, the transmitted laser beam 18 is a high-energy eye-safe Q-switched pulsed laser beam comprising a sequence of high-energy pulses. The Q-switched pulsed laser beam 18 reflects from the building 16, producing three laser returns 20 from three different surfaces of the building 16 for each pulse of the laser beam 18. By measuring the time between transmission of a given pulse and the detection of the corresponding laser returns by the ladar system 12, the distance to the building 16 and its various surfaces is determined.

As the aircraft 10 passes over or by the building 16, it fires the laser 18 for a predetermined time, called the dwell time or the measuring time ($T_{meas}$). Throughout the measuring time T, the angle ($\theta$) at which the transmitted laser beam 18 and the returns 20 strike and reflect from the building 16 changes ($\Delta\theta$). As the angle $\theta$ changes, each surface of the building 16 yields a return at a slightly different frequency than returns from the other surfaces due to Doppler frequency shifts in the returns from the radial motion of the aircraft 10 relative to the building 16. The Doppler frequency shifts depend on the angle at which the transmitted laser beam 18 strikes the different surfaces of the building 16.

Each return pulse 20 effectively samples the Doppler tones that are present due to the radial motion of the aircraft 10 relative to the building 16. Each return pulse is sampled several times (N times), with each sample being stored in a range bin corresponding to the time at which the sample was taken. The time at which the sample was taken represents the distance or range corresponding to the sample. Over the measuring time $T_{meas}$, several return pulses are sampled by a high-speed A/D converter, as discussed more fully below. After all the samples have been taken, the phase and frequency correction process may be performed. The sampled data in N range bins and M pulses is output to Discrete Fourier Transform (DFT) modules. The DFT modules extract data from the individual range bins to compute frequency spectrum associated with each range bin. The frequency spectrum represent cross-range information, which indicate the relative angular position associated with the sampled data from each range bin. Consequently, the angular position associated with each range bin yields range and cross-range information for each surface of the building 16. This range and cross-range information may then be plotted to yield an accurate profile of the building 16 in the direction of travel 14 of the aircraft 12.

The measuring time ($T_{meas}$) multiplied by the velocity (V) of the aircraft is proportional to the synthetic aperture, which is inversely proportional to the cross-range resolution of the ladar system 12. Generally, the Doppler frequency shift (Doppler velocity) ($f_d$) associated with a return 20 due the motion of the aircraft 10 relative to the building 16 for a small angle $\theta$ is given by the following equation:

$$f_d = \frac{2V}{\lambda} \cdot \sin(\theta) \cong \frac{2V}{\lambda} \cdot \theta, \qquad [1]$$

where $\lambda$ is the wavelength of the transmitted laser beam 18, and V is the velocity of the aircraft 10.

The angle $\theta$ corresponding to the Doppler shift $f_d$ given by the following equation, which is obtained by rearranging equation (1):

$$\theta = \frac{\lambda f_d}{2V} \Rightarrow \delta\theta = \frac{\lambda \cdot \delta f_d}{2V}, \qquad [2]$$

where $\delta\theta$ is a small change in angle $\theta$ and represents the cross-range resolution, while $\delta f_d$ is a corresponding small change in the Doppler shift $f_d$ and corresponds to the accuracy with which the Dopplered $f_d$ shift can be measured.

The best frequency resolution given by the following equation, which is obtained from Fourier theory:

$$\delta f_d \approx \frac{1}{T_{meas}}, \qquad [3]$$

where $T_{meas}$ is the measuring time or dwell window during which scene measurements are performed by the ladar system 12.

The cross-range resolution $\delta\theta$, also called the resultant Field Of View (FOV) is given by the following equation:

$$\delta\theta = \frac{\lambda}{2V \cdot T_{meas}} = \frac{\lambda}{2 \cdot D_{synth}}, \qquad [4]$$

where $D_{synth} = VT_{meas}$, which is the synthetic aperture size.

Using the synthetic aperture approach, one could use a relatively small physical aperture and set the measuring time $T_{meas}$ such that $2VT_{meas} = 75$ cm. In coherent ladar systems, $T_{meas}$ represents the time during which the transmitted laser must remain coherent. The ladar system 12 of the present invention does not require that the transmitted laser beam 18 be coherent.

For a typical cross-range resolution of 20 cm (required for long-range high-resolution topography) operating 100 km from scene 16 at an eye-safe laser wavelength of $1.5 \times 10^{-6}$ m, from a plane flying at 200 m/s, the measuring time $T_{meas}$ is approximately 1.875 milliseconds. The bandwidth required for the line of sight resolution is approximately 300 MHz. The figure of merit, the bandwidth-time product, BT, of laser beam 18 is approximately 560,000.

Figure 2:
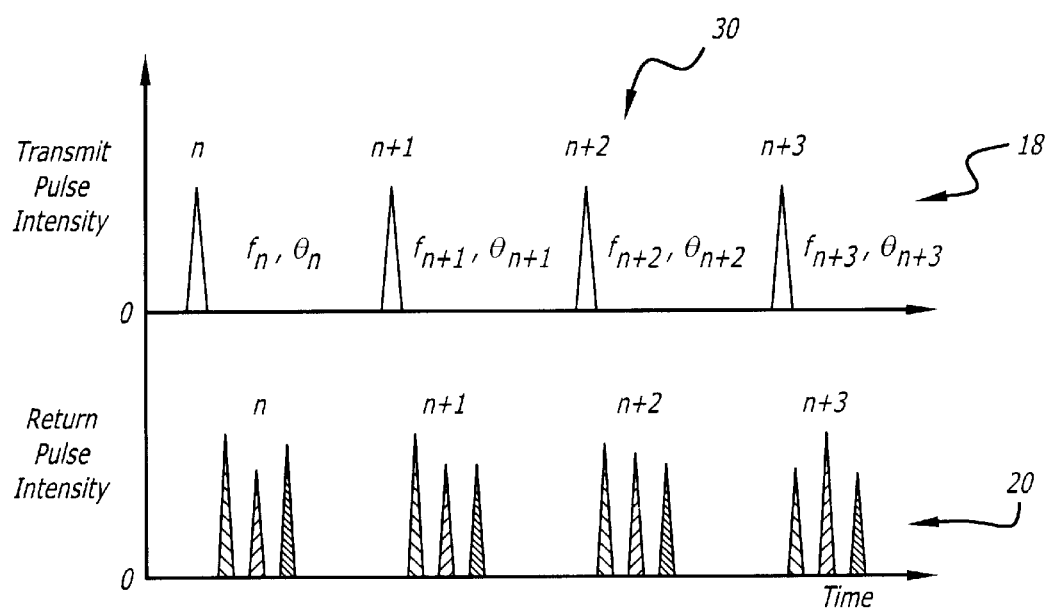
FIG. 2 is a graph showing an exemplary ladar pulse train transmitted by the ladar system of FIG. 1 and a received pulse train after reflection off three different surfaces.

FIG. 2 is a graph 30 showing an exemplary Q-switched laser pulse train 18 transmitted by the ladar system 12 of FIG. 1 and a received pulse train 20 detected by the ladar system 12 after reflection off three different surfaces of the building 16 of FIG. 1. The graph 30 is shows pulse intensity versus time.

Each pulse (n→n+3) of the transmitted pulse train 18 yields, a short time later, a corresponding set of three returns in the received pulse train 20, one return for each surface reflected by the building 16 of FIG. 1. For illustrative purposes, the return pulse train 20 has three distinct returns for each transmitted pulse of the pulse train 18. In practice, each set of three returns in the pulse train 20 are typically closer together and may blend into a single return pulse, with different peaks, each peak corresponding to a surface of the building 16.

The transmitted pulse train 18 is incoherent from pulse to pulse, and consequently has a random phase and random frequency offsets. Each pulse of the transmitted pulse train 32 is associated with a frequency offset ($f_n$) and random phase ($\theta_n$). The ladar system 12 of FIG. 1 measures the frequency offsets $f_n$ and phases $\theta_n$ of the outgoing noncoherent pulse train 18 to compensate the return pulse train 20 for frequency offset $f_n$ and phases $\theta_n$, as discussed more fully below.

Figure 3A:
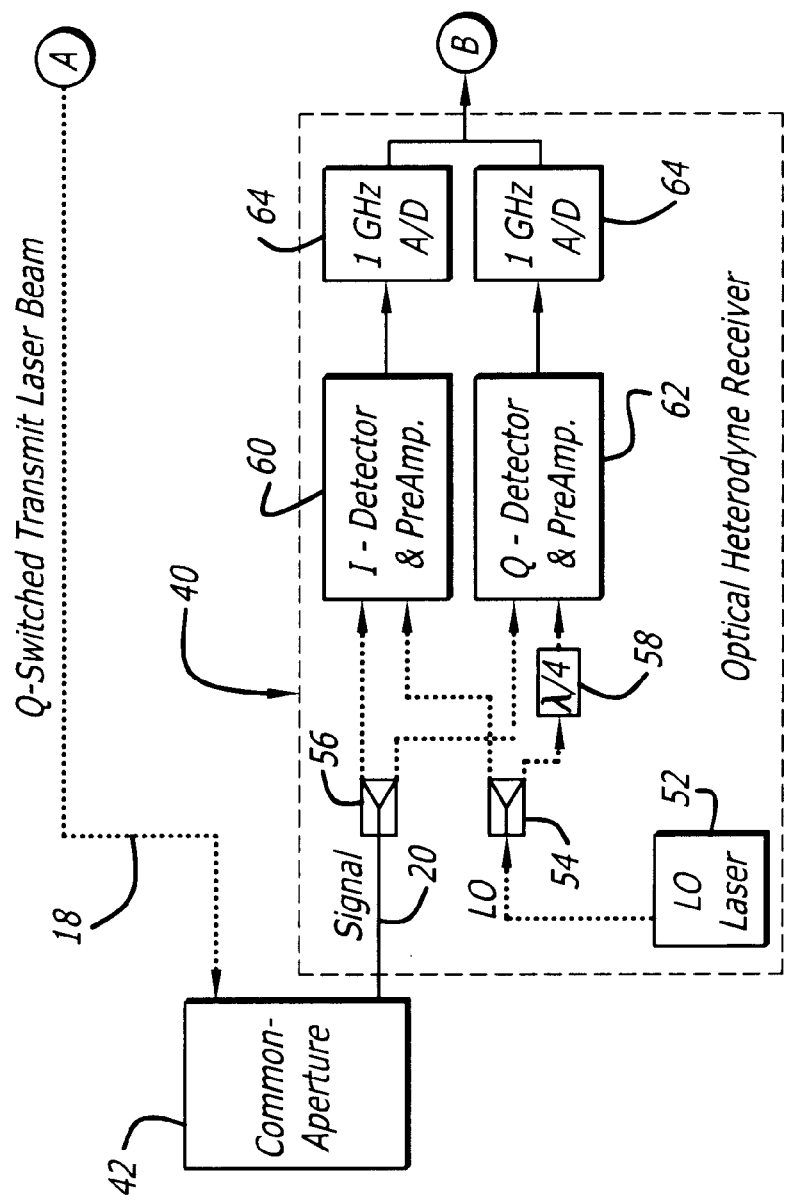
FIG. 3 is a more detailed diagram of the ladar system of FIG. 1 employing an In-phase (I) and Quadrature (Q) laser detector.
Figure 3B:
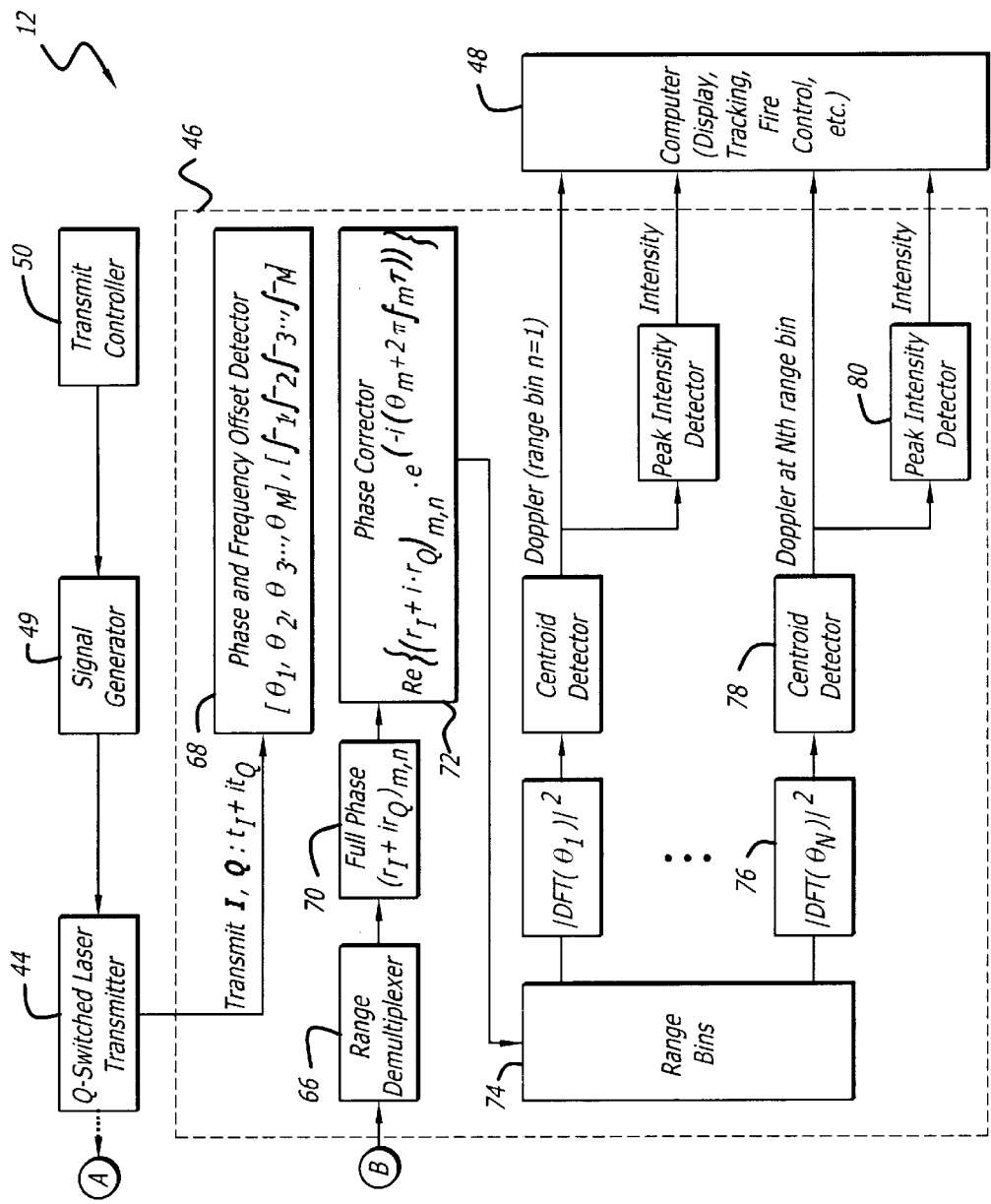

FIG. 3 is a more detailed diagram of the ladar system 12 of FIG. 1 employing an In-phase (I) and Quadrature (Q) laser receiver 40, which is an optical heterodyne detector. For clarity, various well-known components, such as power sources, signal amplifiers, noise filters, and focusing optics have been omitted from FIG. 3. However those skilled in the art with access to the present teachings will know which components to implement and how to implement them to meet the needs of a given application.

The ladar system 12 includes a common aperture 42, which communicates with a Q-switched laser transmitter 44 and the optical heterodyne receiver detector 40. The transmitter 44 and the heterodyne receiver 40 communicate with a synthetic aperture processor 46, which communicates with la computer 48, such as a display, target tracking, or fire control computer. The Q-switched transmitter 44 receives input from a signal generator 49, which receives input from al transmit controller 50.

In the present embodiment, the ladar system 12 is a monostatic ladar system since the transmitter 44 and the receiver 40 share the common aperture 42. The Q-switched transmitter 44 includes a transmit laser that may be implemented as an Er:Yb:Glass Q-switched laser or an Er:Yb:YAG high-power laser. Those skilled in the art will appreciate that the ladar system 12 may be another type of ladar system, such as a bistatic ladar system employing a different type of transmit laser, without departing from the scope of the present invention.

In operation, the transmit controller 50 provides control signals to the signal generator 49 which specify waveform details, such as pulse width, energy per pulse, pulse spacing, and so on. The signal generator 49 generates an electrical signal according to the waveform details. The electrical signal drives the Q-switched laser transmitter 44, which produces a Q-switched laser beam 18 characterized by the waveform details. The Q-switched laser transmitter 44 determines I and Q components of the Q-switched transmitted laser beam 18 before transmission from the ladar system 12. The I and Q components of the outgoing Q-switched laser beam 18 are determined similarly to the optical heterodyne receiver 40, as discussed more fully below. The I and Q components of the outgoing Q-switched laser beam 18 are input to a phase and frequency offset detector 68 of the synthetic aperture processor 46. The transmit controller 50 and/or the signal generator 49 may be implemented via software running on the synthetic aperture processor 46 without departing from the scope of the present invention.

The transmitted laser beam 18 reflects from the scene, such as the building 16 of FIG. 1, yielding the laser return signal 20, which is detected by the optical heterodyne receiver 40. The optical heterodyne receiver 40 includes a local oscillator laser 52, a first beam splitter arrangement 54, a second beam splitter arrangement 56, a quarter-wave retarder 58, an in-phase (I) optical detector 60, a quadrature (Q) optical detector 62, and 1 GHz analog-to-digital converters 64.

In operation, the local oscillator 52 transmits a coherent Continuous Wave (CW) reference laser beam, in the form of a sine wave, to the first beam splitter arrangement 54. The first beam splitter arrangement 54 transmits the local oscillator reference signal to the I-detector 60 and the quarter-wave retarder 58. The quarter-wave retarder 58 converts the input sine wave into a laser beam having a cosine waveform and transmits the cosine waveform to the surface of the Q-detector 62. Similarly, the first beam splitter arrangement 56 splits the laser return beam 20 received from the common aperture 42 into two sinusoidal beams. The two sinusoidal beams strike the I-detector 60 and the Q-detector 62 coincident with the beams output by the first beam splitter arrangement 54 and the quarter-wave optical retarder 58, respectively.

The I-detector 60 and the Q-detector 62 detect beat frequencies, called Doppler tones, corresponding to I and Q received signal components, respectively. The I-detector 60 and the Q-detector 62 convert respective the I and Q received signal components into corresponding analog I and Q electrical signals. The I and Q analog electrical signals are then sampled at 1 GHz Analog-to-Digital (A/D) converters 64. The A/D converters output a 1 GHz digital received signal having I and Q components. The 1 GHz digital received signal is then input to a range demultiplexer 66 implemented in the synthetic aperture processor 46.

The synthetic aperture processor 46 includes the range demultiplexer 66, which provides input to a full phase circuit 70. The full phase circuit 70 provides input to a phase corrector 72. The phase corrector 72 also receives input from the phase and frequency offset detector 68 from the M transmitted pulses. The phase corrector 72 provides output to a set of N range bins 74 and M pulses per range bin. Each $n^{th}$ range bin of the N range bins 74 provide output to N corresponding Discrete Fourier Transform (DFT) circuits 76. The N DFT modules 76 provide input to N corresponding centroid detectors 78. The N centroid detectors 78 provide Doppler information to the computer 48 and to N corresponding peak intensity detectors 80. The peak intensity detectors 80 provide intensity input to the computer 48.

In operation, the various modules 66–80 of the synthetic aperture processor 46 are implemented in software. The synthetic aperture processor 46 may be implemented by the computer 48 without departing from the scope of the present invention.

The A/D converters 64 sample the analog signals output from the I-detector 60 and the Q-detector 62 at predetermined intervals based on a priori knowledge of the pulse spacing of the transmitted laser beam 18. The A/D converters 64 may be preset with pulse spacing information or may obtain the pulse spacing information via a connection (not shown) to the Q-switched laser transmitter 44. The intervals at which the A/D converters 64 sample the received signal coincide with pulses the received analog I and Q signal output from the detectors 60 and 62. The A/D converters take N samples per pulse. The number of samples N taken per pulse depends on the pulse width of the transmitted laser 18 and the sampling rate (1 GHz) of the A/D converters 64 and the range window that is desired. In the present specific embodiment, the sampling rate is approximately three nanoseconds. The exact pulse width, intensity, frequency, and other waveform characteristics of the transmitted laser beam 18 are application-specific and may be determined by one skilled in the art to meet the needs of a given application.

Each of the N digital I and Q samples output by the A/D converters 64 per pulse are demultiplexed onto a single path by the range demultiplexer 66 and input to the full phase circuit 70. The full phase circuit 70 expresses the sampled demultiplexed I and Q signal output from the range demultiplexer 66 in imaginary form, $r_I+ir_Q$, where $r_I$ is the in-phase component of the received signal and $ir_Q$ is the imaginary component. Expressing the return signal in this form $(r_I+ir_Q)$ facilitates phase correction by the phase corrector 72.

Frequency and phase information about the transmitted laser beam 18 is provided to the phase and frequency offset detector 68. I and Q components, $t_I$ and $it_Q$, respectively, of the transmitted laser beam 18 are forwarded to the phase and frequency offset detector 68 by the Q-switched laser transmitter 44. The Q-switched laser transmitter 44 determines the I and Q components of the transmitted laser beam 18 similar to the way the optical heterodyne receiver 40 determines I and Q components of the received signal 20. The phase and frequency offset detector 68 extracts frequency and phase information $([\theta_1, \theta_2, \theta_3, \ldots, \theta_M], [f_1, f_2, f_3, \ldots, f_M])$ from the transmit signal $(t_I+it_Q)$ via methods known in the art. The phase and frequency information includes measured phase offsets and frequency offsets that occur from one Q-switched pulse to the next.

The relative phase $\theta_n$ of each transmitted pulse of the transmitted beam 18 is detected and recorded by the transmitter 44 of the ladar system 12. A measured phase array $([\theta_1, \theta_2, \theta_3, \ldots, \theta_M])$ and a frequency offset (frequency hop) array $([f_1, f_2, f_3, \ldots, f_M])$ computed by the phase and frequency offset detector 68 are used to correct the received signal in preparation for a subsequent Fourier transform operation, as discussed more fully below.

In this mode, the pulses of the received signal are not necessarily evenly spaced. However, the reference beam output by the local oscillator 52 is coherent throughout the measuring time, $T_{meas}$. The local oscillator 52 may be implemented with a standard laser usually of the same base material as the transmitter, such as Er:Yb:Glass or Er:YAG in the current embodiment. As is known in the art, the coherence of the local oscillator 52, which is relatively low-power and runs in CW mode, is easier to maintain than a high energy pulsed transmit laser, such as the Q-switched laser transmitter 44.

After the I and Q received signals are obtained via the optical heterodyne receiver 40, they are digitized by the A/D converters 64. To reduce computational requirements, the range demultiplexer 66 performs range demultiplexing. The range demultiplexer 66 adjusts the input bit stream so that the subsequent phase correction is only performed at range bins associated with expected returns. After the received signal $r_n$ for a range bin n is collected, the phase corrector 72 corrects it.

The phase corrector 72 employs the phase and frequency information $([\theta_1, \theta_2, \theta_3, \ldots, \theta_M], [f_1, f_2, f_3, \ldots, f_M])$ of all M pulses, to apply a phase correction term $(e^{(-i(\theta_m+2\pi f_m \tau))})$ to the received signal $r_I+ir_Q$. The phase corrector 72 then outputs a corrected signal at range bin n ($S_n$) given by the following equation:

$$S_n = Re\{(r_I+i\cdot r_Q)_{n,m} \cdot e^{(-i(\theta_m+2\pi f_m \tau))}\}, \quad [5]$$

where $(r_I+ir_Q)_{n,m}$ represents a portion of digital received signal associated with an $n^{th}$ range bin and the $m^{th}$ pulse, and having an in-phase component $r_I$ and a quadrature component $r_Q$; $\theta_m$ represents a phase correction term associated with the $m^{th}$ pulse; $F_n$ represents a frequency correction term associated with the $m^{th}$ pulse; and $\tau$ is a digital time variable.

The phase-corrected signal $S_n$ is then clocked into the range bins 74, which may be implemented via a software register. After the N range bins have been filled by $S_1$ through $S_N$, which represents the portion of the received signal corresponding to a single set of returns, the range bins 74 are cleared in parallel as the contents of the range bins 74 are clocked into the N corresponding DFT modules 76. The DFT modules 76 compute the square of the magnitude of the DFT of the signal corresponding to each range bin. For example, the DFT operation for the signal in the first range bin $S_1(m)$, where m is an integral time variable, involves accumulating $S_1(m)$ according to the following equation:

$$|DFT_1(\omega)|^2 = \left|\sum_{m=0}^{M-1} S_1(m) e^{-j\omega m}\right|^2, \quad [6]$$

where M is the number of samples taken during the measuring time $T_{meas}$; $\omega=2\pi k/L$, k=0, 1, 2, ..., M−1; $S_i(m)=0$ for 0>m>M. $DFT_i(\omega)$ represents the frequency response associated with the first range bin of the range bins 76. The magnitude squared of $DFT_n(\omega)$ will preferably have one or more peaks at the frequency corresponding to the Doppler tone associated with the $n^{th}$ range bin as discussed more fully below. This frequency peak represents cross-range information associated with the $n^{th}$ range bin.

The DFT modules 76 compute the $DFT_i(\omega)$ via Fast Fourier Transform (FFT) algorithms, which are well known in the art. The DFT modules 76 output frequency responses (spectrums) to the corresponding centroid detectors 78. The centroid detectors 78 compute the centroids of the frequency responses, via methods known in the art, yielding center frequencies. The center frequencies output by the centroid detectors 78 represent cross-range information in the form of Doppler frequencies. This cross-range information is input to the computer 48. The computer 48 may then generate a range versus cross-range plot based on the cross-range information and the range information. The range information is indicated by the number of the range bin associated with cross-range information output by each centroid detector 78. Furthermore, the cross-range information from the centroid detectors 78 is input to corresponding peak intensity detectors 80. The peak intensity detectors 80 compute intensity information corresponding to the magnitudes of the peaks of the centroids and not just the frequency locations of the centroids. The intensity information corresponding to each range bin is also input to the computer 48.

The computer 48 may include a display, tracking software, fire control software, chemical analysis software, and so on. In the present embodiment, the computer 48 runs software for displaying a cross-range versus range plot, which is indicative of a profile of the scene, such as the building 16 of FIG. 1 being imaged.

Figure 4:
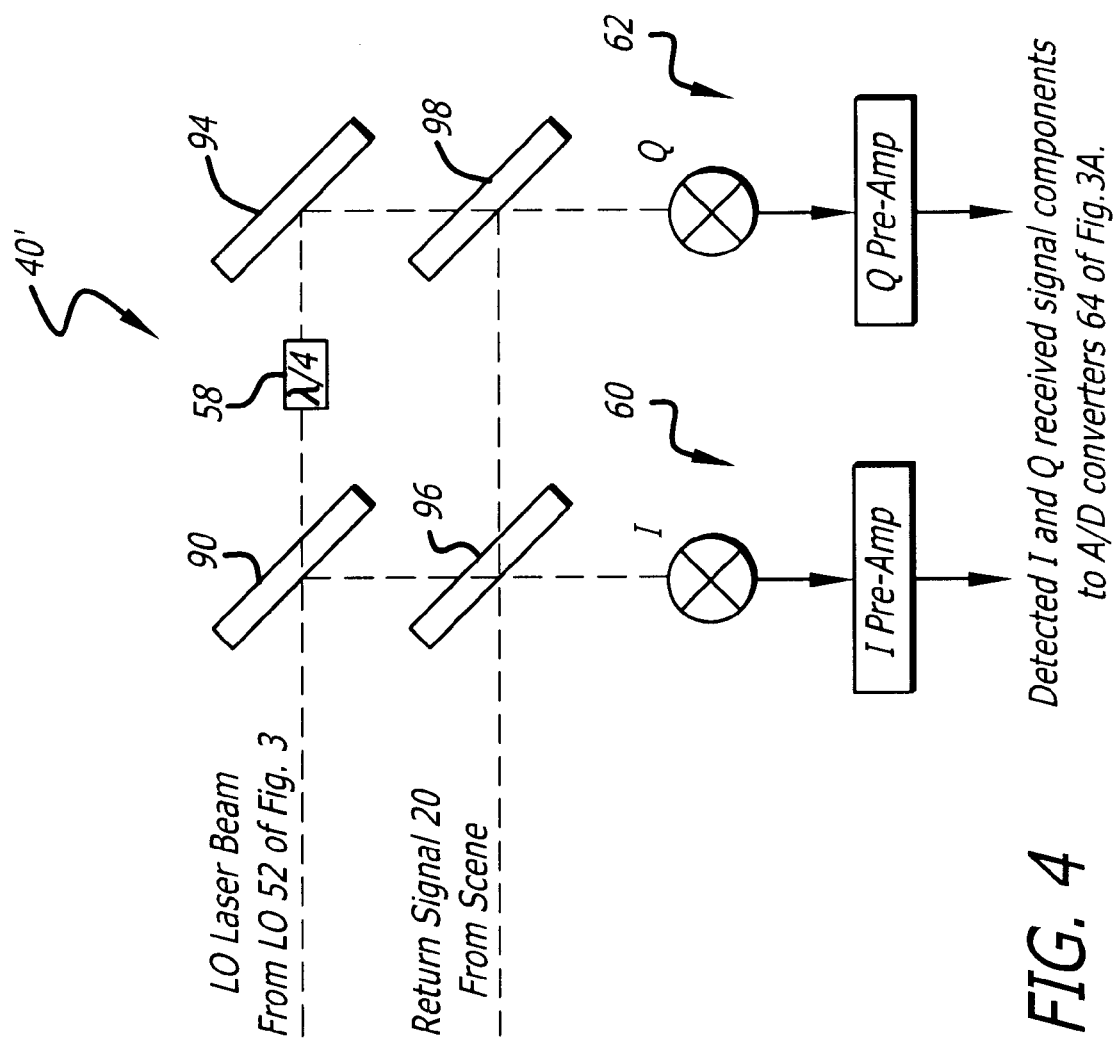
FIG. 4 is more detailed diagram of an alternative embodiment of the I and Q laser detector of FIG. 3.

FIG. 4 is more detailed diagram of an alternative embodiment 40' of the I and Q laser receiver 40 of FIG. 3. The I and Q laser detector 40' is an optical heterodyne detector that includes a first beam splitter 90, a quarter wave retarder 58, a mirror 94, a second beam splitter 96, a third beam splitter 98, the I-detector and pre-amplifier 60, and the Q-detector and pre-amplifier 62.

In operation, the sinusoidal local oscillator reference beam is split by the first beam splitter 90, which directs a first portion of the reference beam to the third beam splitter 98 and a second portion of the reference beam to the quarter wave retarder 58. The quarter wave retarder 58 converts the sine-wave input to a cosine-wave output, which reflects off the mirror 94, passes through the second beam splitter 96 and onto the detecting surface of the Q-detector and pre-amplifier 62. The second portion of the sine-wave reference beam passes through the third beam splitter 98 and onto the detecting surface of the I-detector and pre-amplifier 60.

The transmissivity (coefficient of transmission) and reflectivity (coefficient of reflection) of the various beam splitters 90–98 are adjusted to equalize the total energies at the surfaces of the detectors 60 and 62. Consequently, the first detector 60 will receive equivalent percentages of the first and second beams as received by the second detector 62. In the present specific embodiment, the first beam splitter 90 is a 5% beam splitter; the mirror 94 is a 100% beam splitter, the second beam splitter 96 is a 95% beam splitter, and the fourth beam splitter 98 is a 50% beam splitter.

The received laser return signal received is split into a first and second portion by the 50% beam splitter 96. The first portion is directed to the detecting surface of the I-detector and pre-amplifier 60, where it mixes with the local oscillator sine-wave signal, yielding a beat or Doppler tone corresponding to an in-phase (I) signal component of the received laser return signal. The second portion of the received laser return signal reflects from the 95% beam splitter 98 onto the detecting surface of the Q-detector and pre-amplifier 62. It then mixes with the cosine-wave derived from the local oscillator reference signal, yielding a beat or Doppler tone corresponding to a Quadrature (Q) signal component of the received laser return signal.

Converting the received signal into I and Q components via the optical heterodyne receiver 40' facilitates recovering Doppler information from the received signal via phase correction operations. The Doppler information may be recovered by using the recorded phase and frequency offset measured of each individual transmitted pulse. To perform phase correction operation, the received signal phase must be also known unambiguously, which is enabled via I and Q detection implemented by the receiver 40'.

Generally, the return signal is split into two beams, one is mixed with an local oscillator laser beam that has a natural optical oscillation (sin($\omega$t)), and the other return beam is mixed with a version of the local oscillator reference beam that has been shifted in phase to have an optical oscillation cos($\omega$t). This shift is obtained by employing the optical retarder 58 of $\lambda/4$.

Figure 5:
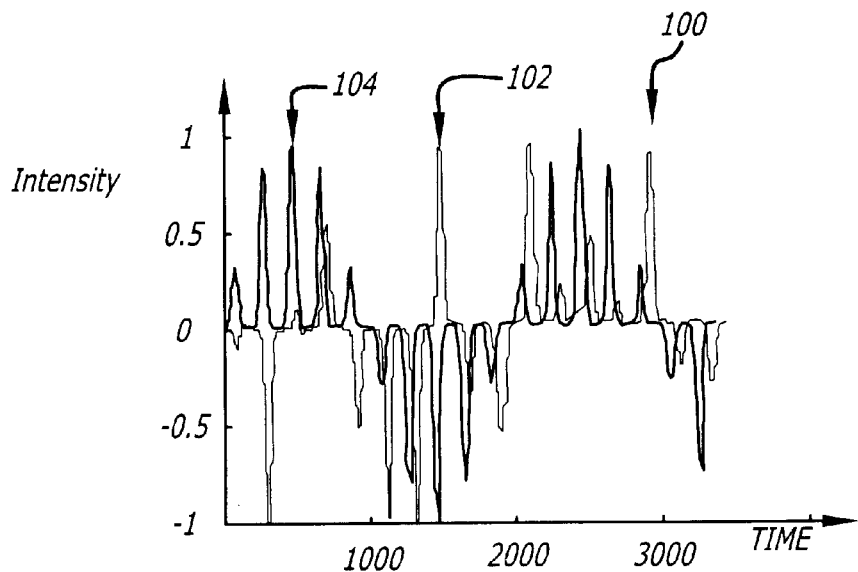
FIG. 5 is an amplitude versus time graph of Doppler tones detected in a train of coherent ladar pulses and incoherent pulses via a conventional ladar system (not shown).

FIG. 5 is an amplitude versus time graph 100 of first and second Doppler tones 102 and 104 detected in a train of coherent ladar pulses and incoherent pulses, respectively, via a conventional ladar system (not shown). The sinusoidal form of the first Doppler tone 102 is clear due to the coherence of the received pulses and is obtained by sampling a train of received coherent pulses at the pulse repetition rate. The second Doppler tone 102 is obtained by sampling a train of received noncoherent (incoherent) pulses at the pulse repetition rate. However, the second Doppler tone (shown dotted) 104 is unclear, and the Doppler tone information appears lost due to the incoherence (random phase and frequency offsets) of the received pulses corresponding to the Doppler tone 104.

The present invention employs measured frequency and phase offset information of the transmitted waveform and employs this information to restore the Doppler tone information in the received signal. This relieves previous coherence requirements placed on the transmitted laser, thereby enabling use of various types of desirable transmit laser beam waveforms, such as high-energy Q-switched pulses.

Figure 6:
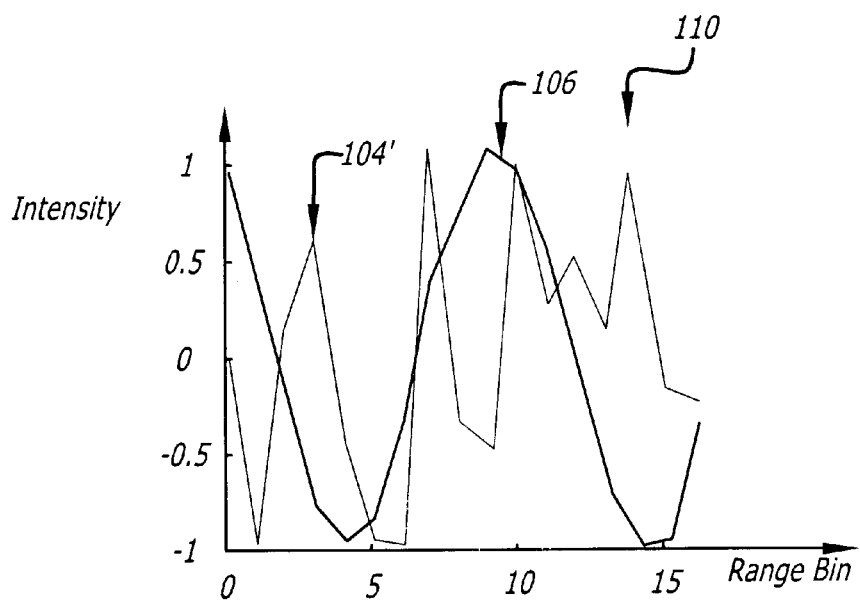
FIG. 6 is an amplitude versus range bin graph juxtaposing Doppler tones obtained from an exemplary received signal with and without phase correction by the ladar system of FIG. 3.

FIG. 6 is an amplitude versus range bin graph 110 juxtaposing Doppler tones 104' and 106 obtained from exemplary received signal with and without phase correction, respectively, by the ladar system 12 of FIG. 3. With reference to FIGS. 3 and 6, without phase correction by the phase corrector 72, the contents of the range bins 46 might have an exemplary random pattern (shown dotted) 104', corresponding to the Doppler tone 104 of FIG. 5. After phase correction by the phase corrector 72, the contents of the range bins 46 contain clear Doppler tone information 106.

Figure 7:
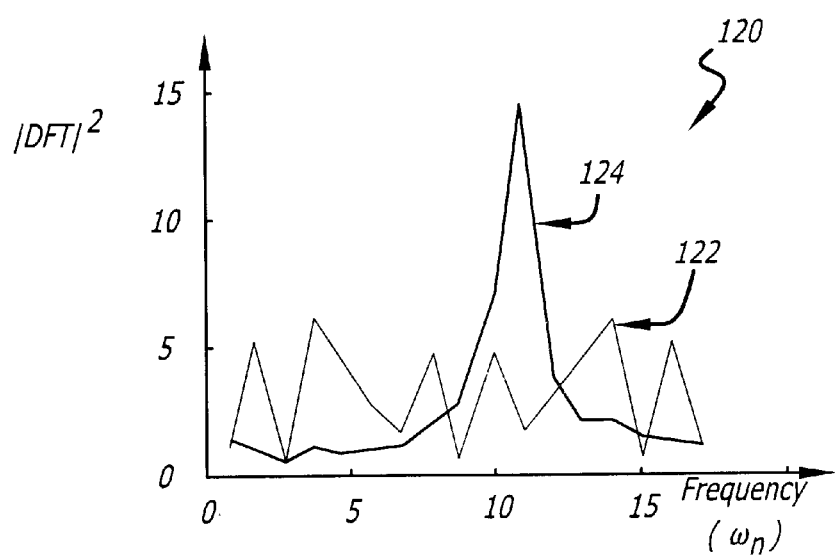
FIG. 7 is an intensity versus frequency graph juxtaposing the frequency responses of an exemplary received signal with and without correction by the ladar system of FIG. 3.

FIG. 7 is an intensity versus frequency graph 120 juxtaposing the frequency responses 122 and 124 of an exemplary received signal with and without phase correction, respectively, by the ladar system 12 of FIG. 3. The uncorrected frequency response 122 appears as background noise. The corrected frequency response 124, which corresponds to a particular range bin n, has a clear peak at a particular frequency. The location of the peak in terms of frequency corresponds to the relative angular position of the surface that produced the set of returns corresponding to the peak. This relative angular position represents cross-range information.

The intensity of the peak of the corrected frequency response 124 may be employed by the computer 48 of FIG. 3 to approximate the reflectivity of the surface that produced the return. The intensity information may be employed do differentiate the various detected surfaces by reflectivity.

Figure 8:
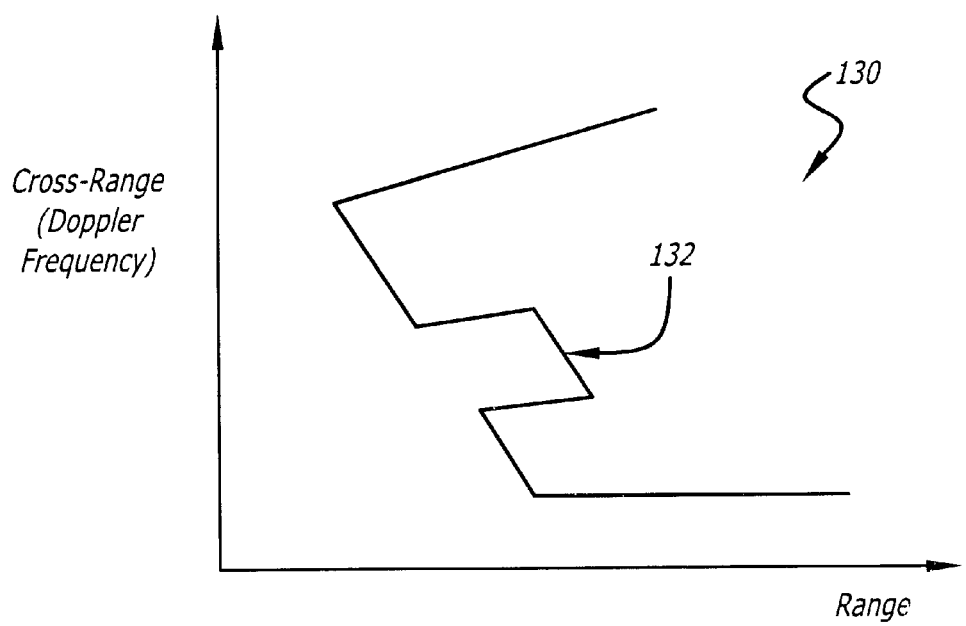
FIG. 8 is a frequency versus range graph illustrating exemplary image information output by the ladar system of FIG. 3.

FIG. 8 is a frequency versus range graph 130 illustrating exemplary image information output by the ladar system 12 of FIG. 3. With reference to FIGS. 3 and 8, the graph 130 shows a profile 132 based on the cross-range information (Doppler frequency information) extracted from the range bins 74 via the DFT modules 76 and the centroid detectors 78. The profile 132 depicts the profile of the building 16 of FIG. 1 in the direction of flight of the aircraft 12. Target cross-sections, such as the profile 132 may greatly improve the accuracy of automatic target recognition systems Thus, the present invention has been described herein with reference to a particular embodiment for a particular application. Those having ordinary skill in the art and access to the present teachings will recognize additional modifications, applications, and embodiments within the scope thereof.

It is therefore intended by the appended claims to cover any and all such applications, modifications and embodiments within the scope of the present invention.

Accordingly,

What is claimed is:

1. A ladar system comprising:

first means for generating a laser beam;

second means for recording phase information pertaining to said laser beam and subsequently transmitting said laser beam from said system in response thereto;

third means for receiving a reflected version of said laser beam and providing a received signal in response thereto, said third means including an In-phase (I) and Quadrature (Q) receiver for implementing I and Q detection and outputting said received signal having I and Q electrical signal components in response thereto; and fourth means for correcting said received signal based on said phase information recorded by said second means.

2. The system of claim 1 wherein said ladar system is a synthetic aperture ladar system that further includes fifth means for moving said ladar system while said ladar system operates.

3. The system of claim 2 wherein said fourth means includes a synthetic aperture processor for correcting said received signal in accordance with said phase information and providing a corrected ladar signal in response thereto.

4. The system of claim 3 wherein said synthetic aperture processor includes means for applying a Discrete Fourier Transform (DFT) to said corrected ladar signal to obtain high frequency resolution and cross-range resolution.

5. The system of claim 3 further including fifth means for constructing a coherent range-Doppler profile based on said corrected ladar signal and said movement of said ladar system.

6. The system of claim 1 wherein said first means includes an Er:Yb:Glass Q-switched laser.

7. The system of claim 1 wherein said first means includes an Er:Yb:YAG high-power laser.

8. The system of claim 1 wherein said second means includes a digitizer for recording said phase information and frequency information.

9. The system of claim 8 wherein said phase information includes waveform information about said laser beam including, measured phase jumps, phase offsets, frequency hops, and frequency offset.

10. The system of claim 9 wherein said laser beam comprises Q-switched ladar pulses having approximately random phase.

11. The system of claim 1 wherein said I and Q receiver is an optical heterodyne receiver that includes a local oscillator for generating reference beam.

12. The system of claim 11 wherein said optical heterodyne receiver includes an optical retarder for generating a shifted reference beam.

13. The system of claim 12 wherein said heterodyne receiver includes an I-detector and a Q-detector for detecting a combination of said reference beam and said reflected version of said laser beam and a combination of said shifted reference beam and said reflected version of said laser beam, respectively.

14. The system of claim 13 wherein said heterodyne receiver includes one or more beam splitters having reflectivities specified to equalize intensities of said reflected version of said laser beam, said reference beam, and said shifted reference beam at said in-phase and quadrature detectors.

15. The system of claim 1 wherein said third means further includes a digitizer for converting said received signal from an analog signal to a digital received signal having I and Q components.

16. The system of claim 15 wherein said third means further includes a range demultiplexer for isolating portions $((r_I + i^* r_Q)_n$, where n is an integer time index) of said digital received signal representing laser returns each associated with a range bin (n).

17. The system of claim 16 wherein said fourth means includes means for maintaining detected phases ($\theta_1$, $\theta_2$, $\theta_m$, ... $\theta_M$, where M is the number pulses transmitted) associated with each of said range bins and transmitted pulse.

18. The system of claim 17 wherein said fourth means includes means for correcting said digital received signal $((r_I + i^* r_Q)_n)$ based on said detected phases and providing said corrected signal in response thereto in accordance with the following equation:

$$\text{Corrected Signal} = Re\{(r_I + i \cdot r_Q)_{n,m} \cdot e^{(-i(\theta_m + 2\pi f_m \tau))}\}$$

where $(r_I + i^* r_Q)_{n,m}$ represents a portion of the digital received signal associated with an $n^{th}$ range bin and the $m^{th}$ pulse having an in-phase component $r_I$ and a quadrature component $r_Q$; $\theta_m$ represents a phase correction term associated with one of the detected phases that is associated with the $m^{th}$ pulse; $f_m$ represents a frequency correction term associated with the $m^{th}$ pulse; and $\tau$ is a digital time variable.

19. The system of claim 18 further including means for computing centroids, one for each $n^{th}$ portion of said received digital signal based on the square of the magnitude of a DFT of each $n^{th}$ portion of said received digital.

20. The system of claim 19 further including means for extracting peak intensity information and range Doppler information from said centroids.

21. The system of claim 20 further including means for displaying image information about a scene that reflected said laser beam to yield said reflected laser beam.

22. A synthetic aperture ladar system comprising:
first means for transmitting a laser beam having incoherent pulses;
second means for recording phase information pertaining to said incoherent pulses when said synthetic aperture ladar system is in a first position;
third means for receiving a reflected version of said laser beam and providing a received signal in response thereto when said ladar system is in a second position, said third means including an In-phase (I) and Quadrature (Q) receiver for implementing I and Q detection and outputting said received signal having I and Q electrical signal components in response thereto;
fourth means for correcting said received signal based on said phase information and providing a corrected received signal in response thereto; and
fifth means for computing scene information based on said corrected received signal and said first and second positions.

23. A synthetic aperture ladar system comprising:
a Q-switched laser transmitter that transmits a laser beam of incoherent pulses;
a phase and frequency detector that records phase information pertaining to said incoherent pulses when said synthetic aperture ladar system is in a first position;
an optical receiver for receiving a reflected version of said laser beam and providing in phase and quadrature signals in response thereto when said ladar system is in a second position;
a phase corrector that corrects said received signals based on said phase information and provides a corrected received signal in response thereto; and
a synthetic aperture processor that provides scene information based on said corrected received signal and said first and second positions.

24. An optical heterodyne receiver comprising:
an oscillator input signal;
a received information signal;
means splitting said oscillator input signal into a first oscillator signal and a second oscillator signal and for splitting said received information signal into a first information signal and a second information signal;
means for applying a quarter wave shift to said second oscillator signal to yield a shifted oscillator signal in response thereto;
means for combining said first oscillator signal and said first information signal into an in-phase signal and combining said second oscillator signal and said shifted oscillator signal into a quadrature signal;
an in-phase detector for detecting said in-phase signal and providing an in-phase electrical signal in response thereto; and
a quadrature detector for detecting said quadrature signal and providing a quadrature electrical signal in response thereto.

25. A method for enhancing the operation of a synthetic aperture ladar system comprising the steps of:
generating a laser beam;
recording phase information pertaining to said laser beam and subsequently transmitting said laser beam from said system in response thereto;
receiving a reflected version of said laser beam and providing in phase and quadrature signals in response thereto; and
correcting said received signals based on said recorded phase information.

* * * * *

UNITED STATES PATENT AND TRADEMARK OFFICE
CERTIFICATE OF CORRECTION

PATENT NO.    : 6,559,932 B1
DATED         : May 6, 2003
INVENTOR(S)   : Maurice J. Halmos It is certified that error appears in the above-identified patent and that said Letters Patent is hereby corrected as shown below:

Drawings,
Sheet 1, Fig. 2, replace all "n" by "m", as shown in the attached amended Fig. 2.
Sheet 3, Fig. 3B, please amend the drawing to include the connecting arrow showing data transfer from "68" to "72" and replace "$\tau$" with -- $\tau_m$ -- , as shown in the attached amended Fig. 3B.
Sheet 5, Fig. 5, the reference numerals 102 and 104 should be reversed, as shown in the attached amended Fig. 5.

Column 4,
Line 3, replace "$((r_I + i^*r_Q)_n,)$" with -- $((r_I + ir_Q)_{n,m})$ --.
Line 6, replace "$(f_1, f_2, f_m, ...., f_M)$" with -- $(f_1, f_2, f_m, ...., f_M)$ --.
Lines 13-14 should read -- Corrected Signal = Real $\{(r_I + ir_Q)_{n,m} \exp(-i(\theta_m + 2\pi f_m \tau_m))\}$ --.
Line 15, replace "$(r_I + i^*r_Q)_{n,m}$" with -- $(r_I + ir_Q)_{n,m}$ --.
Line 46, after "Fig. 3" insert -- , which is comprised of Figs. 3A and 3B, --.

Column 5,
Line 29, replace "$T$" with -- $T_{meas}$ --.

Column 6,
Line 56, delete "is".

Column 7,
Line 4, replace "32" with -- 18 --.
Line 49, replace "determined" with -- applied --.

Column 8,
Line 20, should read: -- then sampled at 1 GHz or greater via Analog-to-Digital (A/D) converters --.
Line 32, replace "provide" with -- provides --.
Line 53, replace "output" with -- outputs --; after "converters" insert -- 64 --.

Column 9,
Line 1, replace "imaginary" with -- complex --.
Line 14, replace "frequency and phase" with -- phase and frequency --.
Line 53, equation [5] should read:
          -- $S_n$ = Real $\{(r_I + ir_Q)_{n,m} \exp(-i(\theta_m + 2\pi f_m \tau_m))\}$ --
Line 58, replace "$f_n$" with -- $f_m$ --.
Line 59, should read -- associated with the $m^{th}$ pulse; $\tau$ is a digital time variable; and $\tau_m$ is the time of the $m^{th}$ transmitted pulse. --

UNITED STATES PATENT AND TRADEMARK OFFICE
CERTIFICATE OF CORRECTION

PATENT NO. : 6,559,932 B1
DATED : May 6, 2003
INVENTOR(S) : Maurice J. Halmos

It is certified that error appears in the above-identified patent and that said Letters Patent is hereby corrected as shown below:

Column 10,
Line 11, replace "$w=2\pi k/L$" with -- $w=2\pi k/T_{meas}$ --
Line 12, replace "$0 > m > M$" with -- $0 \geq m > M$ --
Line 19, replace "$DFT_1(w)$" with -- $DFT(w)$ --

Column 11,
Line 2, replace "95%" with -- 50% --.
Line 3, replace "fourth" with -- third --; replace "50%" with -- 95% --.
Line 5, after "after" insert -- 20 --.
Line 57, replace "signal" with -- signals --.
Line 60 and 64, replace "46" with -- 74 --.
Line 61, replace "(shown dotted)" with -- (in light shade) --.

Column 12,
Line 10, replace "do" with -- to --.
Line 20, after "systems" insert -- . --.

Column 13,
Line 32, replace "$(r_I + i^*r_Q)_n$" with -- $(r_I + i.r_Q)_n$ --.
Line 41, should read:
    -- Corrected Signal= Real $\{(r_I + i.r_Q)_{n,m} \cdot \exp(-i(\theta_m + 2\pi f_m \tau_m))\}$ --
Line 45, should read: -- Corrected Signal = Real $[(r_I + i.r_Q)_n \cdot e(-i(\theta_e + 2\pi f_e))]$ --.
Line 47, replace "$(r_I + i^*r_Q)_{n,m}$" with $(r_I + i r_Q)_{n,m}$ --.

Signed and Sealed this

Eighth Day of June, 2004

JON W. DUDAS
*Acting Director of the United States Patent and Trademark Office*